United States Patent
Fang et al.

(10) Patent No.: US 9,060,259 B2
(45) Date of Patent: Jun. 16, 2015

(54) METHODS AND APPARATUS FOR GROUP PAGING IN WIRELESS NETWORKS

(75) Inventors: Yonggang Fang, San Diego, CA (US); Yuanfang Yu, Shenzhen (CN); Ting Lu, Beijing (CN); Xiaowu Zhao, Shenzhen (CN)

(73) Assignees: ZTE Corporation, Shenzhen (CN); ZTE (USA) Inc., Richardson, TX (US)

( * ) Notice: Subject to any disclaimer, the term of this patent is extended or adjusted under 35 U.S.C. 154(b) by 130 days.

(21) Appl. No.: 13/552,573

(22) Filed: Jul. 18, 2012

(65) Prior Publication Data

US 2013/0021957 A1  Jan. 24, 2013

(30) Foreign Application Priority Data

Jul. 18, 2011  (WO) ............... PCT/CN2011/077268

(51) Int. Cl.
  *H04W 52/02* (2009.01)
  *H04W 8/18* (2009.01)
  *H04W 68/02* (2009.01)

(52) U.S. Cl.
  CPC .............. *H04W 8/186* (2013.01); *H04W 68/02* (2013.01); *H04W 52/0212* (2013.01); *H04W 52/0229* (2013.01)

(58) Field of Classification Search
  None
  See application file for complete search history.

(56) References Cited

U.S. PATENT DOCUMENTS

| | | | | |
|---|---|---|---|---|
| 6,157,622 A * | 12/2000 | Tanaka et al. | ................. | 370/312 |
| 7,486,637 B2 * | 2/2009 | Goldberg | ..................... | 370/329 |
| 8,295,203 B2 * | 10/2012 | Ramakrishnan et al. | ...... | 370/256 |
| 8,364,199 B2 * | 1/2013 | Xue et al. | ................... | 455/552.1 |
| 8,559,986 B2 * | 10/2013 | Lee et al. | ...................... | 455/466 |
| 2004/0008679 A1 * | 1/2004 | Sinnarajah et al. | ........... | 370/390 |
| 2004/0063442 A1 * | 4/2004 | Goldberg | ..................... | 455/458 |
| 2009/0059831 A1 * | 3/2009 | Li et al. | ........................ | 370/312 |
| 2009/0122742 A1 * | 5/2009 | Goldberg | ..................... | 370/312 |
| 2009/0296619 A1 * | 12/2009 | Sammour et al. | ............. | 370/311 |
| 2010/0240373 A1 * | 9/2010 | Ji et al. | .......................... | 455/436 |
| 2011/0149822 A1 * | 6/2011 | Sammour et al. | ............. | 370/311 |
| 2011/0243081 A1 * | 10/2011 | Liu et al. | ....................... | 370/329 |
| 2012/0064921 A1 * | 3/2012 | Hernoud et al. | ........... | 455/456.6 |
| 2012/0155282 A1 * | 6/2012 | Dorenbosch | ................. | 370/241.1 |
| 2012/0220325 A1 * | 8/2012 | Zhou et al. | .................... | 455/509 |
| 2013/0021957 A1 * | 1/2013 | Fang et al. | .................... | 370/311 |

(Continued)

FOREIGN PATENT DOCUMENTS

| | | |
|---|---|---|
| CN | 101132559 A | 2/2008 |
| CN | 101350955 A | 1/2009 |

(Continued)

OTHER PUBLICATIONS

Chinese Office Action mailed on Jul. 3, 2014 for Chinese Patent Application No. 201210249160.0, filed Jul. 18, 2012 (9 pages).

(Continued)

*Primary Examiner* — Ian N Moore
*Assistant Examiner* — Lakeram Jangbahadur
(74) *Attorney, Agent, or Firm* — Perkins Coie LLP

(57) ABSTRACT

Methods, apparatus and systems for group paging of wireless devices are described. A wireless device is associated with a member identifier (MID) that is a unique identifier for the wireless device. The wireless device is associated with a group identifier (GID) that is a unique identifier for a group of which the wireless device is a member. The wireless device is woken up from a sleep mode at a wake-up time based on the GID.

11 Claims, 9 Drawing Sheets

(56) References Cited

U.S. PATENT DOCUMENTS

2013/0039297 A1* 2/2013 Wang .............................. 370/329
2013/0084898 A1* 4/2013 Li et al. ......................... 455/466

FOREIGN PATENT DOCUMENTS

| | | |
|---|---|---|
| CN | 101635982 A | 1/2010 |
| CN | 102036244 A | 4/2011 |
| EP | 2 315 474 A1 | 4/2011 |
| WO | 2004/006615 A1 | 1/2004 |

OTHER PUBLICATIONS

Machine Translation of Chinese Patent Publication No. CN 101350955 A, published on Jan. 21, 2009, downloaded on Sep. 18, 2014 from <http://translationportal.epo.org>.

* cited by examiner

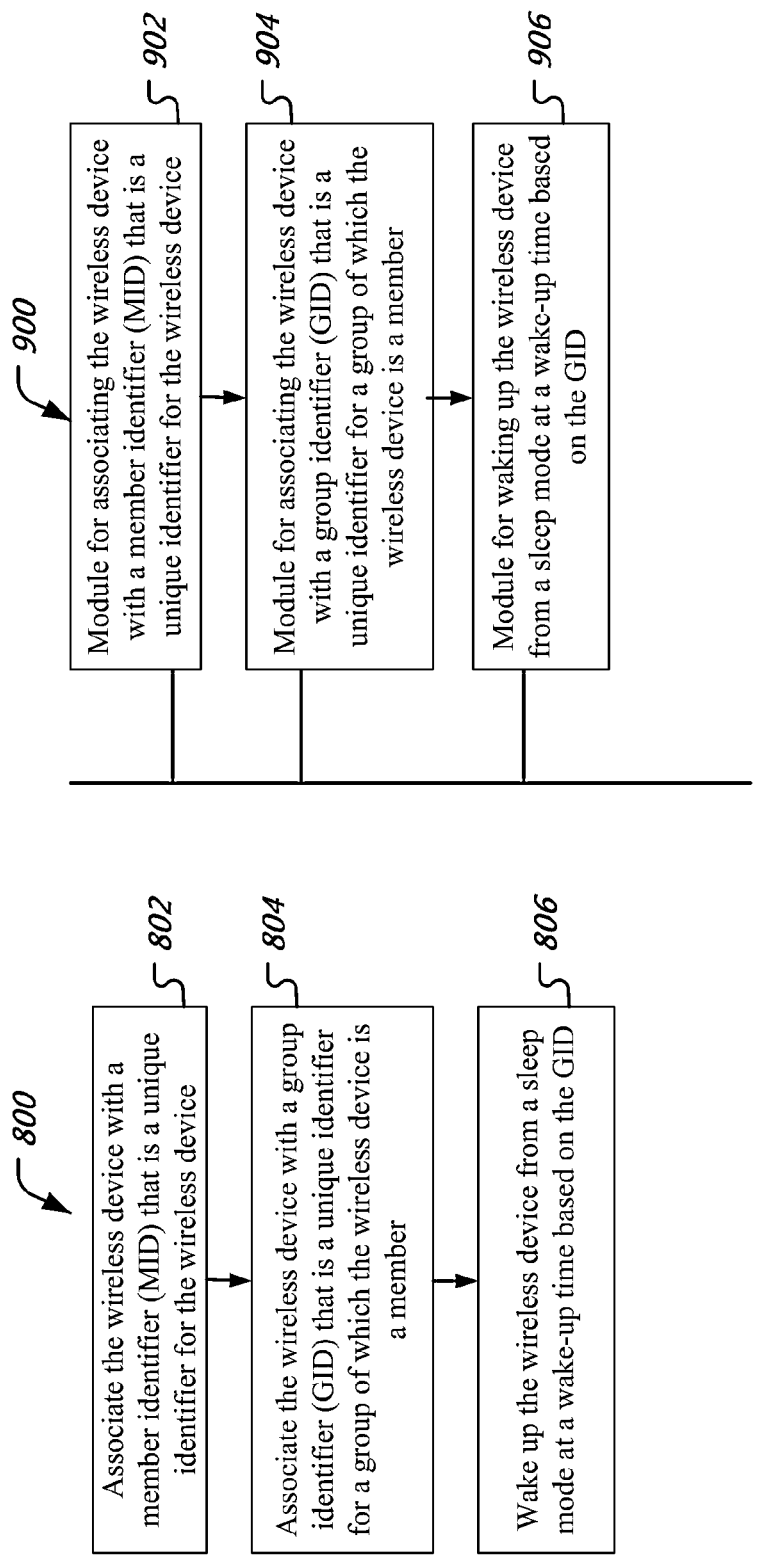

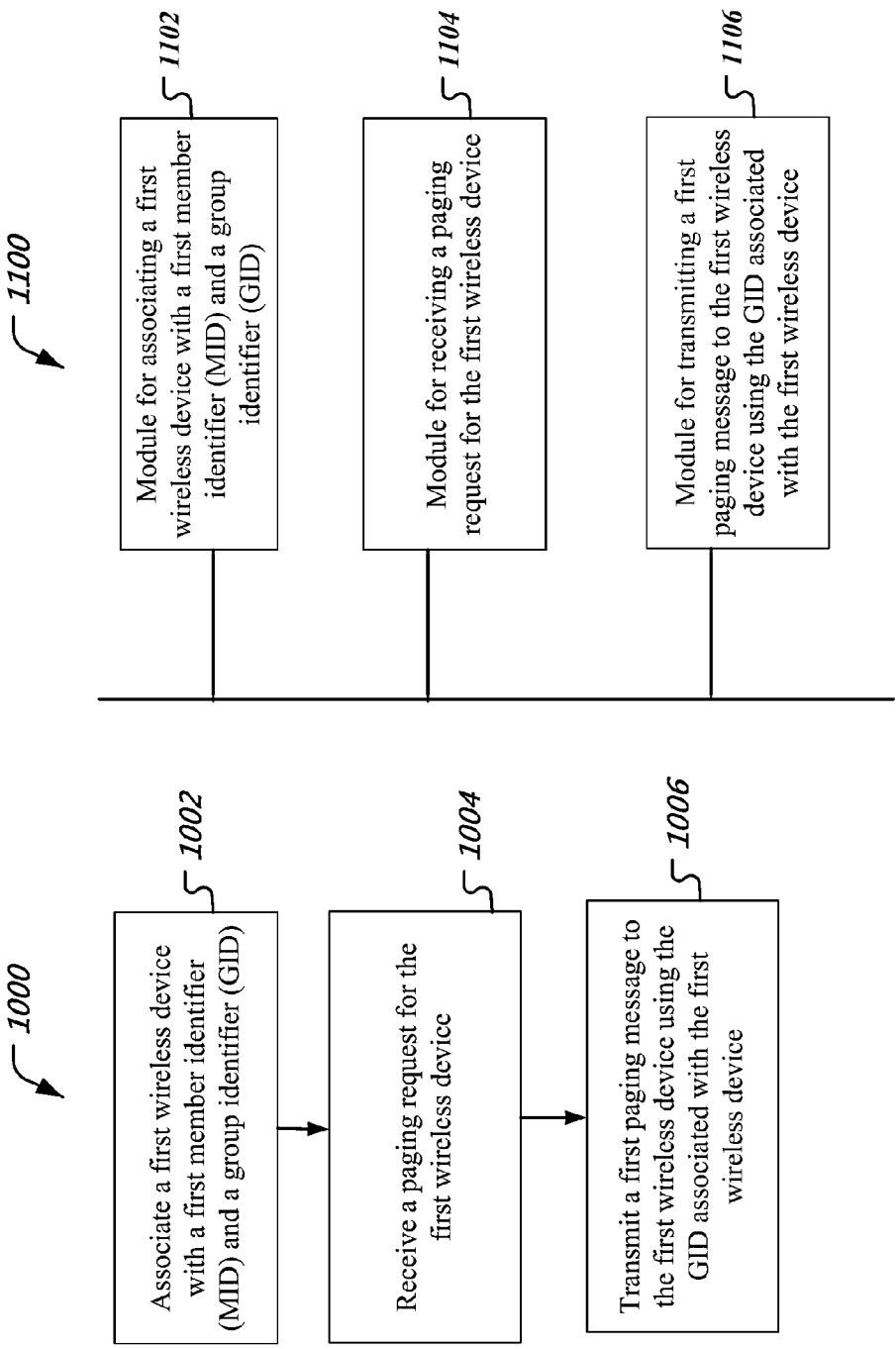

METHODS AND APPARATUS FOR GROUP PAGING IN WIRELESS NETWORKS

CROSS REFERENCE TO RELATED APPLICATIONS

This application claims the right of priority under 35 U.S.C. §119(a) and the Paris Convention of International Patent Application No. PCT/CN2011/077268, filed Jul. 18, 2011. The entire content of the before-mentioned patent application is incorporated by reference as part of the disclosure of this application.

BACKGROUND

This document relates to wireless communications.

Wireless communication systems can include a network of one or more base stations to communicate with one or more wireless devices such as a mobile device, cell phone, wireless air card, mobile station (MS), user equipment (UE), access terminal (AT), or subscriber station (SS). A base station can emit radio signals that carry data such as voice data and other service payload content to wireless devices. A base stations can be referred to as an access point (AP), access network (AN) or eNodeB, or can be included as part of an access network. Further, a wireless communication system can include one or more core networks to connect and control one or more base stations.

A wireless device can use one or more different wireless technologies for communications. Various wireless technologies examples include Code division Multiple Access (CDMA) such as CDMA2000 1x and High Rate Packet Data (HRPD), Long-Term Evolution (LTE), Worldwide Interoperability for Microwave Access (WiMAX), UMTS, etc. In some implementations, a wireless communication system can include multiple networks using different wireless technologies. Some wireless technologies allow a wireless device to sleep for a predetermined period to conserve battery power.

For initiating a connection with a particular wireless device, a wireless network may transmit a paging message targeting the particular wireless device. Multiple transmissions of paging messages, each transmission being for one wireless device, are therefore performed to initiate connections with multiple wireless devices in a logical grouping.

SUMMARY

The techniques disclosed in this patent specification enable, among other things, a group paging technique in which multiple wireless devices may be paged simultaneously for a connection.

In one aspect, a method for wireless communication implemented at a wireless device is disclosed. The wireless device is associated with a member identifier (MID) that is a unique identifier for the wireless device. The wireless device is associated with a group identifier (GID) that is a unique identifier for a group of which the wireless device is a member. The wireless device is woken up from a sleep mode at a wake-up time based on the GID.

In another aspect, an apparatus for wireless communication is disclosed. The apparatus includes a module for associating the wireless device with a member identifier (MID) that is a unique identifier for the wireless device, a module for associating the wireless device with a group identifier (GID) that is a unique identifier for a group of which the wireless device is a member, and a module for waking up the wireless device from a sleep mode at a wake-up time based on the GID.

The details of the above aspects and others and their implementations are set forth in the accompanying drawings, the description and the claims.

BRIEF DESCRIPTION OF THE DRAWINGS

FIG. 8 is a flow chart representation of a process of wireless communication, implementable at a wireless device.

FIG. 9 is a block diagram representation of a portion of an apparatus for wireless communication.

FIG. 10 is a flow chart representation of a process of wireless communication, implementable at a user equipment.

FIG. 11 is a block diagram representation of a portion of an apparatus for wireless communication.

DETAILED DESCRIPTION

This document describes techniques, devices, and systems for enhancement of slotted mode operation for battery operated wireless devices in wireless communications. The enhancement of slotted mode operation can be used for the wireless devices to extend their slot cycles with different length sleep periods for battery life expansion.

Figure 1:
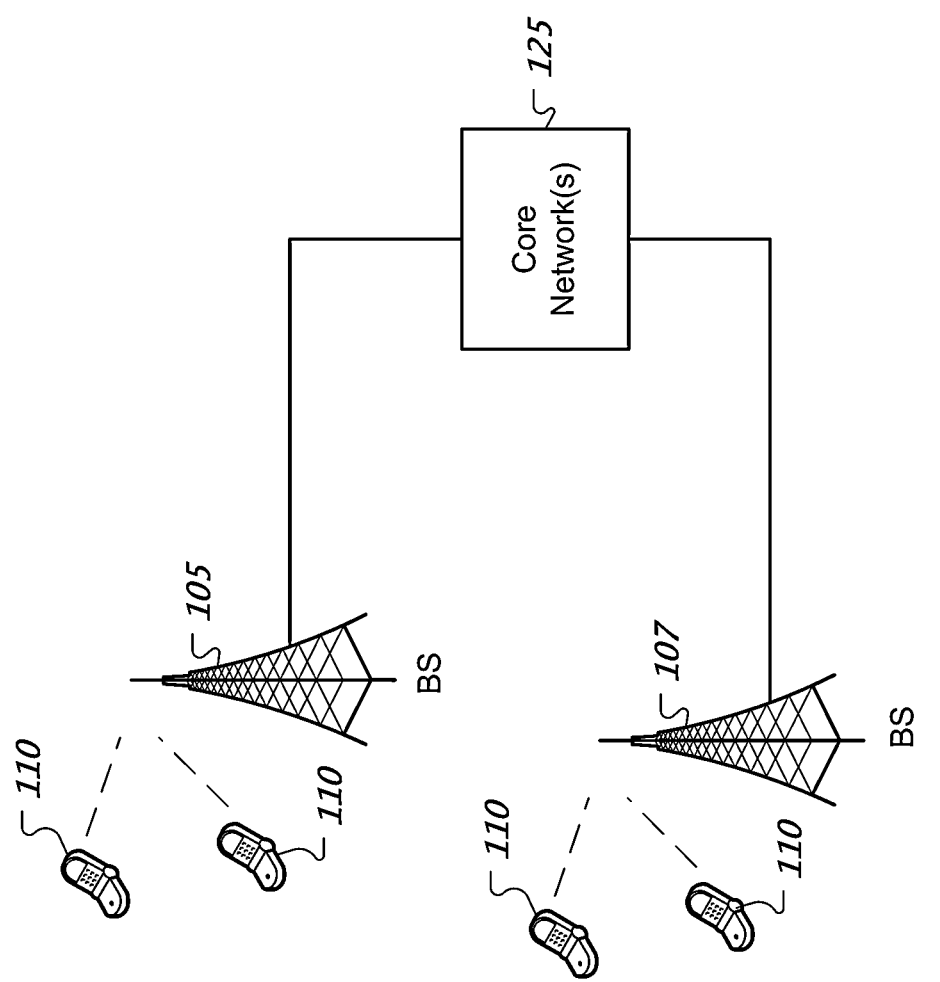
FIG. 1 shows an example of a wireless communication network.

FIG. 1 shows an example of a wireless communication network or system. This wireless communication network can include one or more base stations (BSs) 105, 107 and one or more wireless devices 110. A base station 105, 107 can transmit a signal on a forward link (FL), known as a downlink (DL) signal, to one or more wireless devices 110. A wireless device 110 can transmit a signal on a reverse link (RL), known as an uplink (UL) signal, to one or more base stations 105, 107. A wireless communication system can include one or more core networks 125 to connect and control one or more base stations 105, 107. One or more base stations form a radio access network. A base station, due to its nature of providing radio access for a wireless device, either alone or in combination with one or more other base stations, can be referred to as an access point (AP), an access network (AN) or eNodeB. Examples of wireless communication systems that can implement the present techniques and systems include, among others, wireless communication systems based on Code division Multiple Access (CDMA) such as CDMA2000 1x, High Rate Packet Data (HRPD), Long-Term Evolution (LTE), Universal Terrestrial Radio Access Network (UTRAN), and Worldwide Interoperability for Microwave Access (WiMAX).

Figure 2:
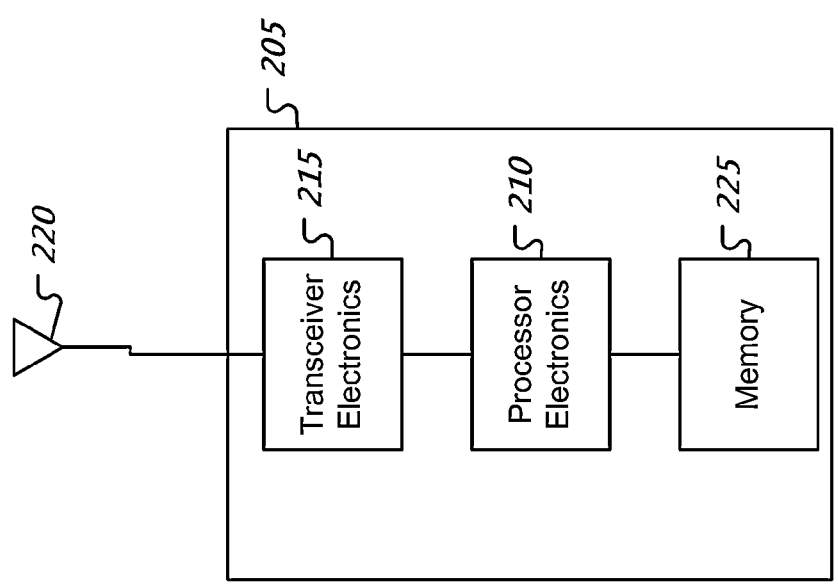
FIG. 2 shows an example of a radio transceiver station.

FIG. 2 shows an example of a radio transceiver station for implementing a wireless device, a base station or other wireless communication modules. Various examples of radio stations include base stations and wireless devices in FIG. 1. A radio station 205 such as a base station or a wireless device can include processor electronics 210 such as a microprocessor that implements methods such as one or more of the techniques presented in this document. A radio station 205 can include transceiver electronics 215 to send and/or receive wireless signals over one or more communication interfaces such as one or more antennas 220. A radio station 205 can include other communication interfaces for transmitting and receiving data. In some implementations, a radio station 205 can include one or more wired communication interfaces to communicate with a wired network. A radio station 205 can include one or more memories 225 configured to store information such as data and/or instructions. In some implementations, processor electronics 210 can include at least a portion of transceiver electronics 215 and a memory 225.

In some implementations, radio stations 205 can communicate with each other based on a CDMA air interface. In some implementations, radio stations 205 can communicate with each other based on an orthogonal frequency-division multiplexing (OFDM) air interface which can include Orthogonal Frequency-Division Multiple Access (OFDMA) air interface. In some implementations, radio stations 205 can communicate using one or more wireless technologies such as CDMA such as CDMA2000 1x, HRPD, WiMAX, LTE, and Universal Mobile Telecommunications System (UMTS).

To facilitate paging operation, each wireless device 110 in a wireless network may be assigned to a unique access service identifier within the network. The unique identifier may be for example international mobile service identifier (IMSI) or unicast access terminal identifier (UATI), as is known in the art. The wireless device 110 may use the unique ID to identify itself in a call originated from the wireless device 110. The network may use the unique ID of a wireless device 110 in a network initiated call to route the call to the wireless device 110 (e.g., paging the wireless device 110).

In the existing wireless networks, there is no way to identify a group of wireless devices simultaneously over the air link interface. For example, no identifiers are available at layer 2 that can be used to identify in a single paging message a logical group of wireless devices. Therefore when the network would like to initiate connections with a group of wireless devices, the network may have to individually page the wireless device one by one over the air link interface. Such serial paging may be inefficient in terms of the amount of time required and/or the bandwidth utilized in paging all wireless devices in the group and may therefore lead to unacceptable user experience in some cases.

Another technical problem associated with using group paging for existing wireless technologies is that the wireless technologies rely on a slotted mode operation in which wireless devices can be periodically idle, thereby allowing wireless devices to enter sleep mode. In the sleep period, the wireless device may turn off its radio transmitter and receiver in order to save battery life. Upon waking up, the wireless device may turn on its radio transmitter and receiver to listen to the signals transmitted by the network.

Therefore, it may be desirable that an access network (e.g., base station) and wireless devices be synchronized so that the access network can transmit a page message to a wireless device when the access network knows the wireless device will be awake (i.e. not in sleep mode).

In some conventional wireless networks, in order to evenly distribute the awake time of wireless devices, the wireless devices and base station may use the wireless device's IMSI or SessionSeed as a hash key to calculate a random time in the slot cycle period. Therefore, different wireless devices may wake up at different times and the network can balance the page channel loading within a slot cycle. However, no techniques are available to enable simultaneous addressing a group of wireless devices and use defining the individual wake up times of the wireless devices in the group.

In group services, such as a smart grid service, a network may send a page message to the whole group of wireless devices for either a network-initiated data transmission over common channel or for the establishment of connections with a group of wireless devices to deliver the data over traffic channels.

According to the existing paging method, the network has to page the group members sequentially since each mobile station has only one unicast ID (IMSI or UATI). As previously discussed, this may reduce the page channel efficiency and may cause page channel to overload, especially when the group size is large and many members of the group are within a cell.

In addition to the group identifier issue, the network may not be able to send one page message to all the wireless devices in a group since each wireless device typically has different waking time determined by device ID. If the same page message is sent to the group members over the paging channel on every page slot in a paging cycle, it would result in a lot of redundant page messages when the Slot Cycle Index (SCI) is set to a large value for group paging or M2M applications.

In some embodiments, member wireless devices of a group may be assigned multiple identifiers. For example, each group may be assigned a group identifier (GID). In some embodiments, GID may use the same format of IMSI for CDMA2000 1x system or UATI (or called GATI) for CDMA2000 high rate packet data (HRPD) system. In some embodiments, mere inspection of the assigned ID may not reveal whether the ID is for a group or for a single device. In other embodiments, GID may be from a different ID space than the unique identifier ID space. An assigned GID may be a common ID shared by the group members.

Accordingly, in some embodiments, each group member (wireless device) may have two identifiers: A member identifier (MID), which is a unique identifier such as an existing IMSI for CDMA2000 1x system or UATI for CDMA2000 HRPD system, and a GID which is shared within the group members. In operation, a wireless device may use both GID and MID simultaneously, as further described below. In some embodiments, when a wireless device belongs to multiple groups, the wireless device may have multiple GIDs but a single MID.

The provisioning of the GIDs and MID may be performed in multiple different ways. In some embodiments, the one or more GIDs and an MID for a wireless device may be pre-configured (e.g., stored in a non-volatile memory). In some embodiments, at least some of the one or more GIDs and an MID for a wireless device may be configured through over-the-air service provisioning (OTASP). In some embodiments, at least some of the GIDs and the MID may be configured through session negotiation. Some embodiments may use a mix of the various provisioning options. In some embodiments, GID(s) and MID may be stored in a non-removal user identity module (UIM) such as eUICC or a removal UIM (UICC) of the wireless device.

In some embodiments, the GID and MID information associated with wireless devices may also be stored in the network entity such as home location register, visited location register HLR/VLR, or authentication, authorization and accounting (AAA) server.

For registration with a network, each wireless device of a group may send a registration message or an UATI Request message by include its MID (e.g. IMSI or RATI) to the network. In addition, each wireless device in the group may send a group registration message/GATI Request message or regular registration message/UATI Request message by including GID information to the network. The network (e.g. base station) may update an entry in a database for the wireless device and also save the binding of MID with GID(s) reported by the wireless device.

Upon receiving a registration request message from a wireless device, the network may send a Registration Accept Order message or a UATI/GATI Assignment message to the mobile station to indicate that the registration process has succeeded. After the registration completes, the wireless device may now have multiple IDs corresponding to itself. In some embodiments, such a Multi-ID wireless device may listen to messages addressed to either GID(s) or its MID over the paging channel or the control channel.

When a Multi-ID wireless device of the group sends an Origination (ORG) or Page Response Message (PRM) to the network, it may use its MID (e.g. IMSI or UATI) in the message to identify itself.

Figure 3:
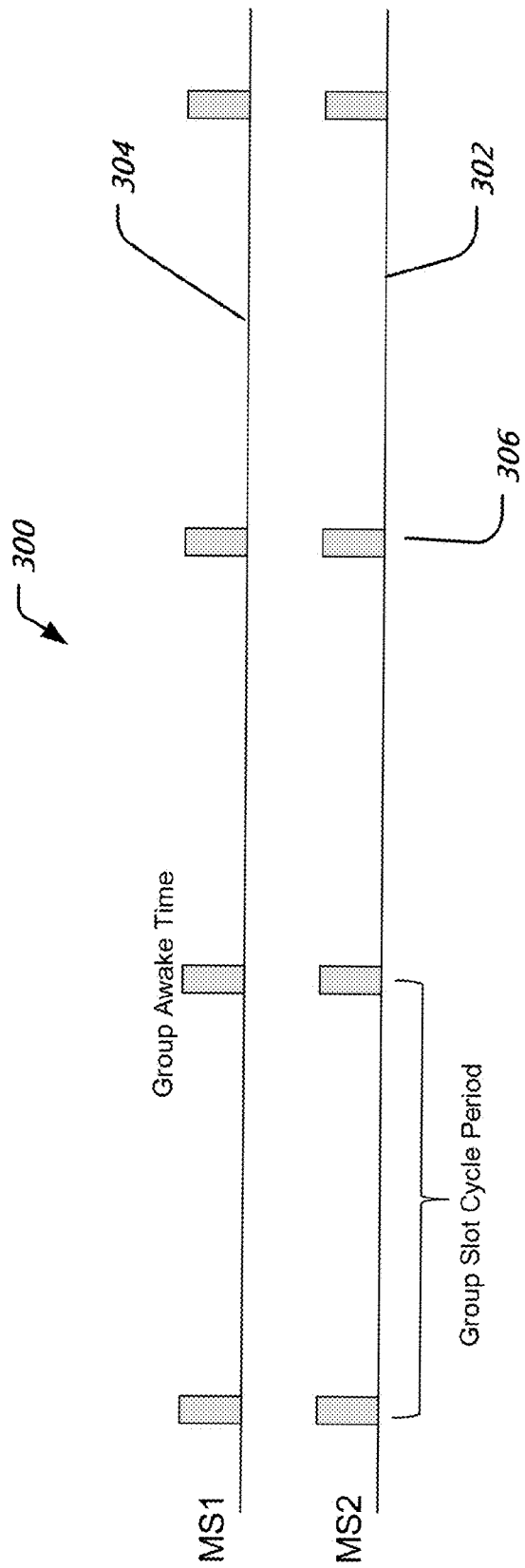
FIG. 3 is a graphical representation of an event timeline in a wireless network.

With reference to FIG. 3, in which a time line 300 of sleep/wake cycles 302, 304 of two wireless devices MS1 and MS2 belonging to a group are depicted, in some embodiments, a multi-ID wireless device may perform the slotted mode operation as follows. The Multi-ID mobile stations in the group and the network may use only the GID to determine the awake-time that is applicable to the group. Therefore all the group members may wake at same time to listen to the page message from the network. This is shown at, e.g., time 306, at which both wireless devices wake up at the same time (because they shared a common GID). In some embodiments, a group member may not wake at other time slots calculated from its IMSI or UATI and the network may not send a page message to the group member at those time slots as well. Therefore Multi-ID wireless devices may not wake more times (per single group) than regular wireless devices.

In some embodiments, e.g., for a CDMA2000 1x network, the waking time could be determined by hashing function with the seed using GID. In some other embodiments, e.g., in a CDMA2000 HRPD network, the waking time could be configured through the attribute of PreferredControlChannelCycle. All the wireless devices in the group may be configured to have the same value of PreferredControlChannelCycle.

Figure 4:
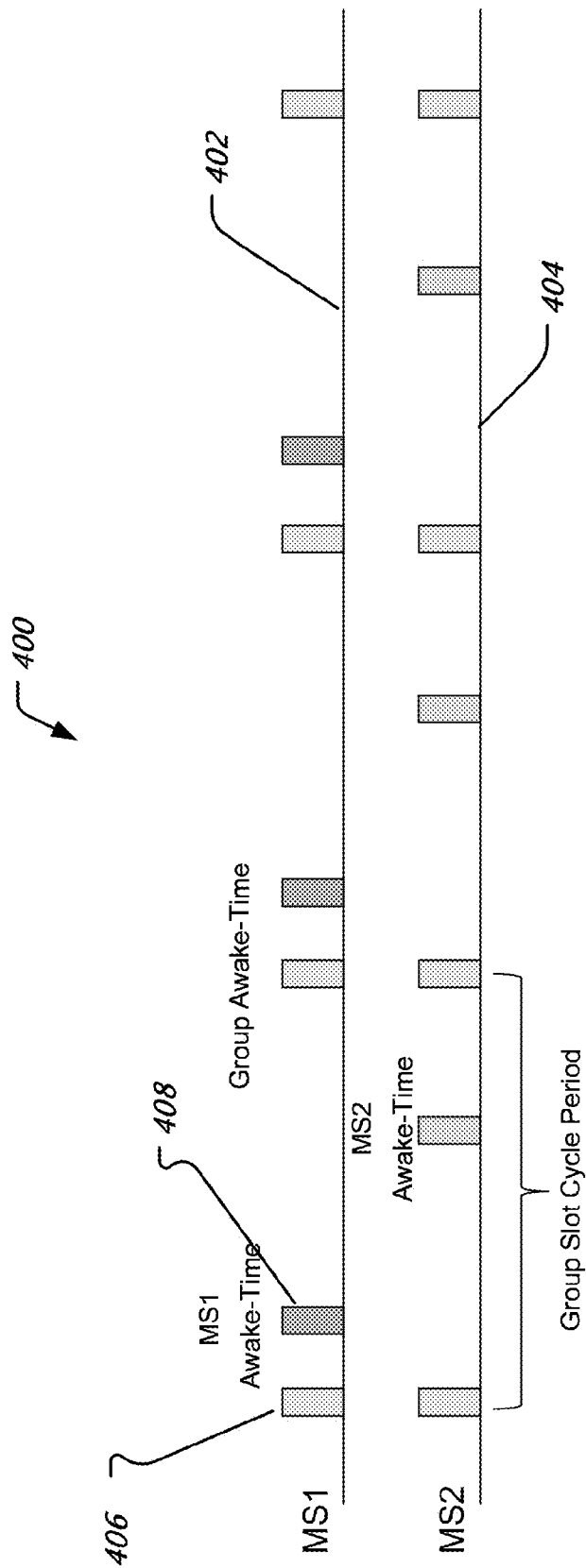
FIG. 4 is a graphical representation of another event timeline in a wireless network.

With reference to FIG. 4, in which a time line 400 of sleep/wake cycles 402, 404 of two wireless devices are depicted, in some embodiments, multi-ID wireless devices in a group and the network may use both GID and MID to determine the awake-time. All the group members may wake at same time (e.g., at time 406) determined by GID to listen to the page message from the network. In addition, a group member may also wake at time slots calculated from its IMSI or UATI (e.g., at time 408). In one aspect, the network may page the individual wireless device in the paging slots calculated from IMSI or UATI as the regular paging process. Therefore these embodiments require less change on the existing network. However, Multi-ID mobile stations may wake up more times than single ID wireless devices. This may not detrimentally impact on non-battery operated devices or have less impact on battery operated devices if SCI is set to very large.

In some embodiments, for a CDMA2000 1x network, the waking time could be determined by hashing function with the seed using GID. In some embodiments, for example a CDMA2000 HRPD network, the waking time could be configured through the attribute of PreferredControlChannelCycle for the group. All the access times (ATs) in the group may be configured as the same value of PreferredControlChannelCycle. The AT can also have its own waking time calculated by its SessionSeed. The network can send a general page message using the IMSI or UATI to page individual group member during the awake-time of group.

In some embodiments, individual pages and/or group page may be used by a network paging the whole group using GID to establish traffic channel for data transmission. In some embodiments, the network may send an SMS/USSD/SDB to the whole group using GID over the paging channel or common control channel during the awake-time of the group.

Each group member may send a response message to the network at the time calculated by the random delay mechanism if the acknowledgement is required. In this way, it could avoid the access channel congestion when many group members try to send their responses back at the same time. In some embodiments, the random delay function may use the existing hash function to calculate the delay. In some embodiments, the delay range may be determined according to the service priority of the group and access priority of group members. The service priority of the group and access priority could be configured through L3 messages. The delay hash key may be based on the group member's MID and used to generate a random number. If the response is not required, a group member may not send the page response back.

Figure 5:
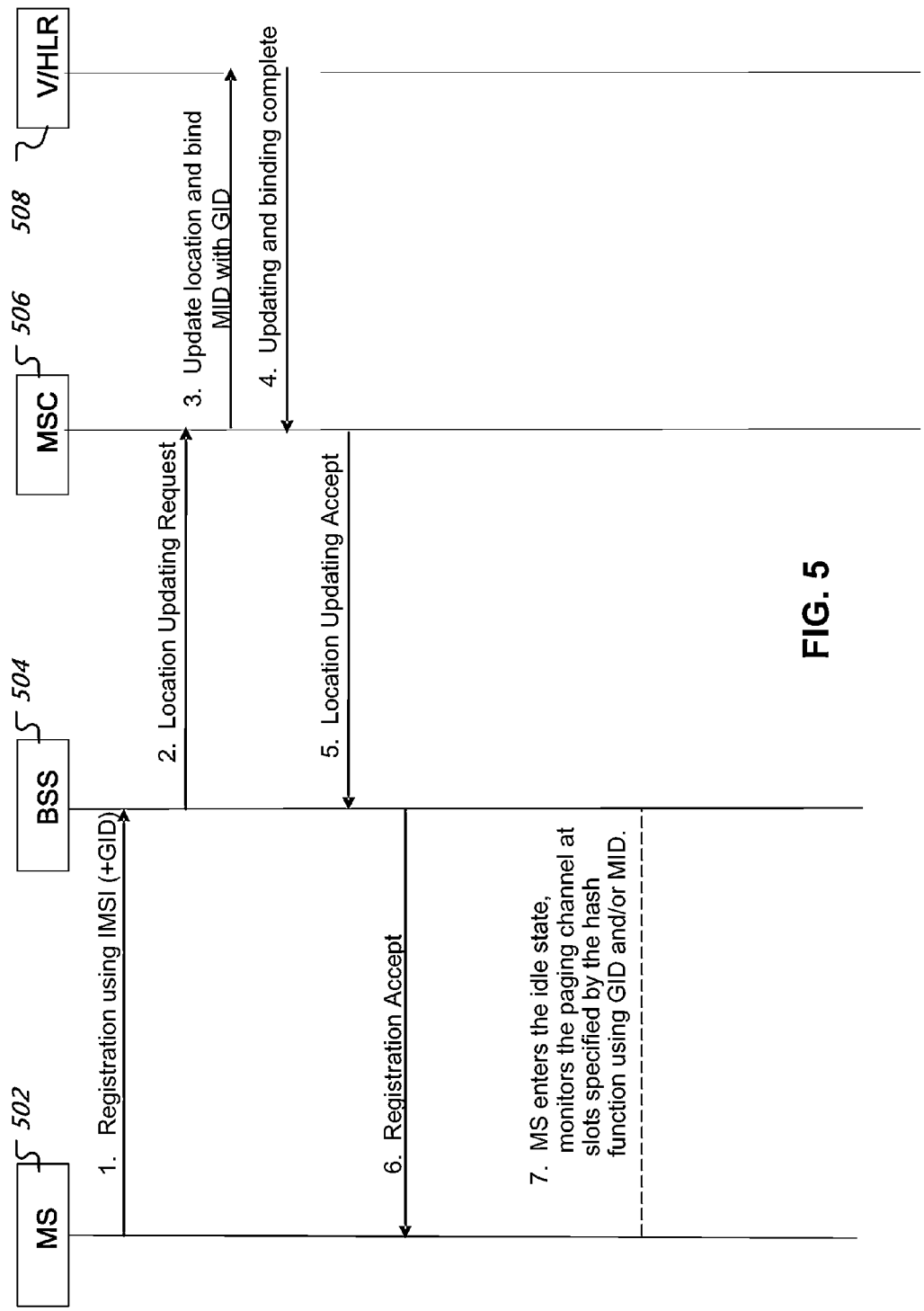
FIG. 5 shows an example of signals exchanged among various entities in a wireless network.

FIG. 5 is a signal exchange diagram showing messages exchanged among a mobile station (wireless device) 502, a base station BSS 504, a mobile switching station MSC 506 and a home or visited location register 508. The messages exchanged may include: (1) the wireless device 502 sends a registration request to the BSS 504, including its unique identifier and any GIDs that the wireless device 502 is associated with, (2) BSS 504 may send a location updating request to the MSC 506, (3) The MSC 506 may update location of the wireless device 502 and bind the device's MID with the received one or more GIDs for the wireless device 502. The MSC 506 may send this information to V/HLR 508. (4) The V/HLR 508 may acknowledge to the MSC 506 that it has received the information. (5) The MSC 506 may send an acknowledgement to the BSS 504 that the location updating request has been fulfilled. (6) The BSS 504 may indicate the completion of registration to the wireless device 502. The wireless device 502 may then begin monitoring slots in the paging channel, determined by the hashing function and. MID and/or GID, as described above.

Figure 6:
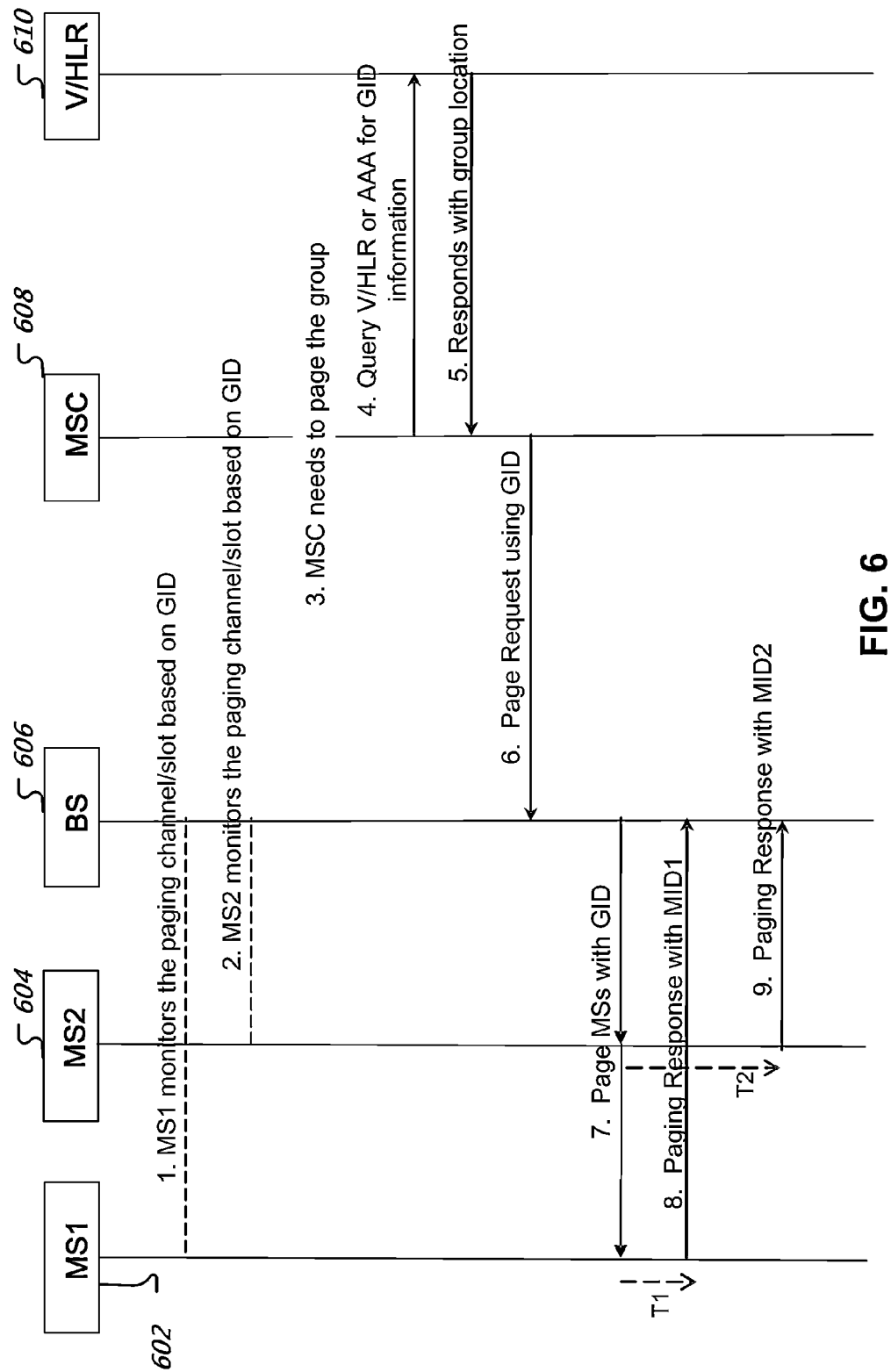
FIG. 6 shows another example of signals exchanged among various entities in a wireless network.

FIG. 6 is a signal exchange diagram showing messages exchanged among two mobile stations (wireless devices) MS1 602 and MS2 604, a base station BSS 606, a mobile switching station MSC 608 and a home or visited location register 610. Initially, (1) the MS1 602 monitors the paging channel and slots, based on the one or more GIDs it is associated with. Similarly, (2) MS2 604 monitors the paging channel and slots, based on the one or more GIDs it is associated with. Then, (3) when the MSC 608 needs to page a group to which both MS1 602 and MS2 604 belong, then (4) the MSC 608 may send a query to the V/HLR 610 (or AAA) to obtain information about how to reach the wireless devices 602, 604. At (5), the V/HLR 610 may respond by providing location information for the devices 602, 604. In some instances, wireless devices 602, 604 may be being serviced by different base stations. In some embodiments, the V/HLR 610 may provide the MSC 608 with a list of base stations that should be contacted for paging the wireless devices of the requested group. At (6), the MSC 608 may send a paging request to the appropriate base station 606 that is providing wireless coverage to the wireless devices 602, 604. (7) The base station 606 may page the wireless devices 602, 604 using the GID to identify the paging message. Depending on the individual random delay response offset, (8) at time T1, the wireless device 602 may respond using its identifier MID1 and (9) at time T2 different from T1, the wireless device 604 may respond using its identifier MID2.

Figure 7:
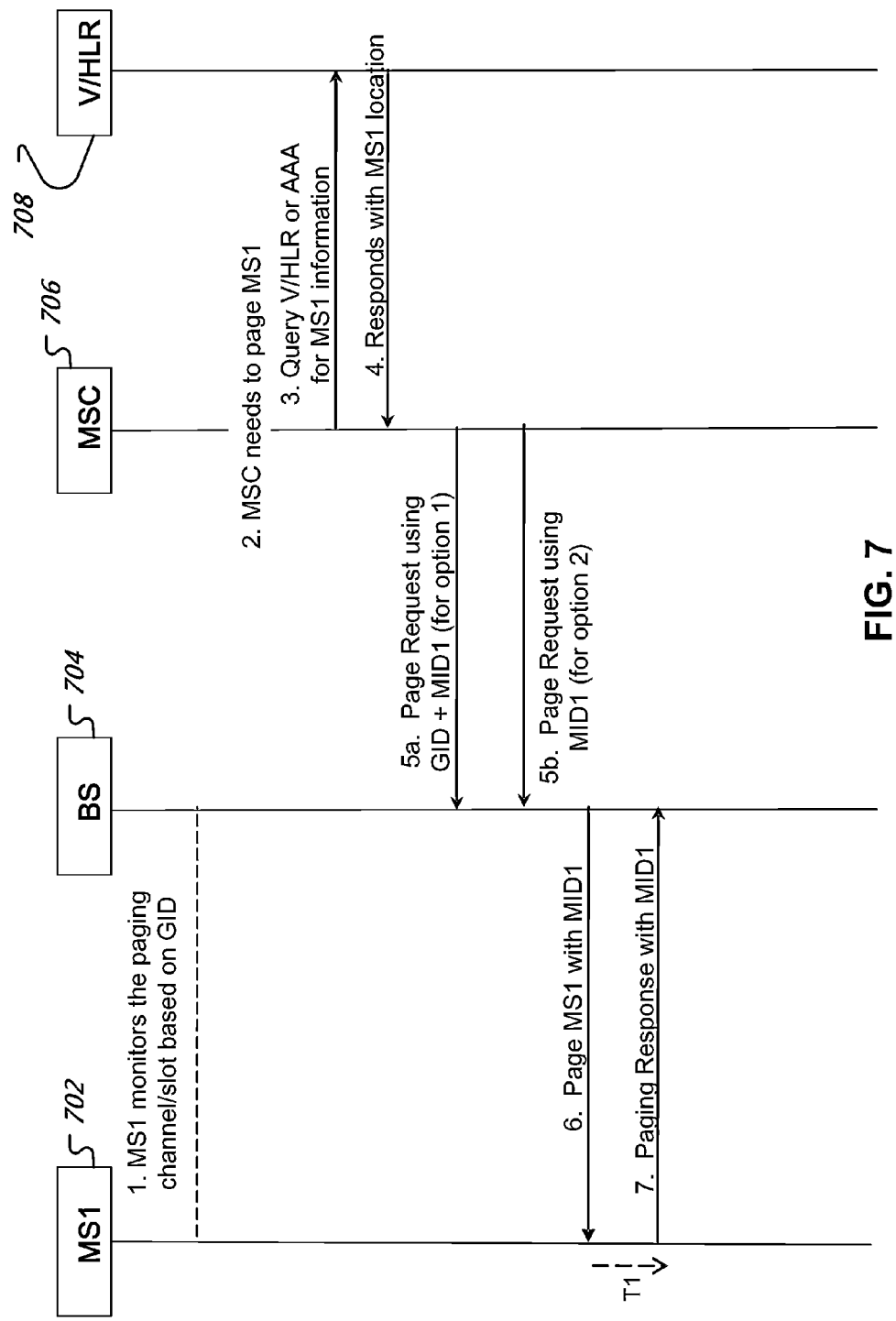
FIG. 7 shows yet another example of signals exchanged among various entities in a wireless network.

FIG. 7 depicts signals exchanged among a wireless device 702, base station 704, MSC 706 and V/HLR 708 in another embodiment of the group messaging technique. (1) Initially, the wireless device 702 may monitor the paging channel for any paging directed to itself, based on a GID that the wireless device 702 is bound with. (2) When the MSC 706 needs to page the wireless device 702, e.g., when an M2M application requests a connection with the wireless device 702, then (3), the MSC 706 queries the V/HLR 708 for the location of the wireless device 702. (4) The V/HLR 708 responds with location information. (5a) In some embodiments, the MSC 706 contact the base station 704 providing wireless coverage to the wireless device 702 and requests a page, based on the GID and the MID associated with the wireless device 702. (5b) Alternatively, in some embodiments, the MSC 706 contact the base station 704 providing wireless coverage to the wireless device 702 and requests a page, based on the MID associated with the wireless device 702. (6) The base station 704 may page the wireless device 702 using the MID for the wireless device 702 at the paging slot calculated from GID or MID. (7) After a duration T1, the wireless device 702 may respond to the page message. As previously discussed, the duration T1 may be random time and depend on a pre-defined hash function.

FIG. 8 is a flow chart representation of a process 800 of wireless communication implemented at a wireless device is disclosed. At 802, the wireless device is associated with a member identifier (MID) that is a unique identifier for the wireless device. At 804, the wireless device is associated with a group identifier (GID) that is a unique identifier for a group of which the wireless device is a member. At 806, the wireless device is woken up from a sleep mode at a wake-up time based on the GID.

FIG. 9 is a block diagram representation of a portion of an apparatus 900 for wireless communication. The apparatus includes module 902 for associating the wireless device with a member identifier (MID) that is a unique identifier for the wireless device, module 904 for associating the wireless device with a group identifier (GID) that is a unique identifier for a group of which the wireless device is a member, and module 906 for waking up the wireless device from a sleep mode at a wake-up time based on the GID.

FIG. 10 is a flow chart representation of a process 1000 of wireless communication. At 1002, a first wireless device is associated with a first member identifier (MID) and a group identifier (GID). At 1004, a paging request is received for the first wireless device. At 1006, a first paging message is transmitted to the first wireless device using the GID associated with the first wireless device.

FIG. 11 is a block diagram representation of a portion of a wireless communication apparatus 1100. The module 1102 is for associating a first wireless device with a first member identifier (MID) and a group identifier (GID). The module 1104 is for receiving a paging request for the first wireless device. The module 1106 is for transmitting a first paging message to the first wireless device using the GID associated with the first wireless device.

To support the group paging operations the entities HLR, VLR and/or AAA may be configured to implement a method for facilitating group paging in a wireless communication network. The method may include receiving information binding a member identifier (MID) for a wireless device with a group identifier (GID), storing the binding information, receiving a location request for a device group and transmitting a location response using the stored binding information.

In some embodiments a wireless communication apparatus may include modules facilitating group paging in a wireless communication network. The wireless communication apparatus may include a module for receiving information binding a member identifier (MID) for a wireless device with a group identifier (GID), a module for storing the binding information, a module for receiving a location request for a device group and a module for transmitting a location response using the stored binding information.

It will be appreciated that methods and apparatus for group paging in wireless networks are disclosed. The disclosed techniques enable, in one aspect, simultaneously sending paging messages to a group of wireless devices over a paging channels by using a GID associated with the group of wireless devices. In another aspect, each wireless device in a group may still be able to use a different wake-up time using a hash function based randomization of wake times.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method of wireless communication, implemented at a wireless device, comprising:
    associating the wireless device with a member identifier (MID) that is a unique identifier for the wireless device;
    associating the wireless device with a group identifier (GID) that is a unique identifier for a group of which the wireless device is a member;
    transmitting a paging request;
    receiving a paging message that is transmitted based on the GID associated with wireless device;
    transmitting a paging response to the paging message;
    entering a wake up mode from a sleep mode at a wake-up time based on the GID such that the wireless device wakes up at the same time as other wireless devices having the same GID; and
    entering an additional wake up mode at another wake-up time based on the MID,
    wherein the method further comprises sending a registration message to a network by including the MID and the GID associated with the wireless device, the registration message causing the network update a database to store information binding the wireless device with the MID and the GID.

2. The method of claim 1, further comprising:
    storing the MID and the GID in a non-volatile memory at the wireless device.

3. The method of claim 1, further comprising:
    receiving the MID and the GID in an over-the-air service provisioning (OTASP) message.

4. The method of claim 1, further comprising:
    calculating the wake-up time using a hash function.

5. The method of claim 1, further comprising:
    sending a response message at a time based on a random delay mechanism.

6. The method of claim 5, further comprising:
    determining a range of the random delay using a service priority of the group and an access priority of the wireless device.

7. A wireless communication apparatus, comprising:
    means for associating the wireless device with a member identifier (MID) that is a unique identifier for the wireless device;
    means for associating the wireless device with a group identifier (GID) that is a unique identifier for a group of which the wireless device is a member;
    means for transmitting a paging request;
    means for receiving a paging message that is transmitted based on the GID associated with wireless device;
    means for transmitting a paging response to the paging message;
    means for waking up the wireless device from a sleep mode at a wake-up time based on the GID such that the wireless device wakes up at the same time as other wireless devices having the same GID; and
    means for waking up the wireless device at another wake-up time based on the MID,
    wherein the wireless communication apparatus further comprises means for sending a registration message to a network by including the MID and the GID associated with the wireless device, the registration message causing the network update a database to store information binding the wireless device with the MID and the GID.

8. A computer program product comprising a non-transitory computer readable medium having instructions stored thereon, the instructions comprising:
    code for associating the wireless device with a member identifier (MID) that is a unique identifier for the wireless device;
    code for associating the wireless device with a group identifier (GID) that is a unique identifier for a group of which the wireless device is a member;
    code for transmitting a paging request;
    code for receiving a paging message that is transmitted based on the GID associated with wireless device;
    code for transmitting a paging response to the paging message;
    code for waking up the wireless device from a sleep mode at a wake-up time based on the GID such that the wireless device wakes up at the same time as other wireless devices having the same GID; and
    code for waking up the wireless device f at another wake-up time based on the MID,
    wherein the computer program product further comprises code for sending a registration message to a network by including the MID and the GID associated with the wireless device, the registration message causing the network update a database to store information binding the wireless device with the MID and the GID.

9. A method of wireless communication:
associating a first wireless device having a first member identifier (MID) and a group identifier (GID) and a second wireless device having a second member identifier (MID) with the same GID, wherein the GID determines a same wake up time at which the first wireless device and the second wireless device wake up from their respective sleep modes and the first and second MIDs determine additional wake up times at which the first and second wireless devices wake up from their respective sleep modes, respectively;
receiving paging requests for the first wireless device and the second wireless device;
transmitting a first paging message and a second paging message to the first wireless device and the second wireless device, respectively, using the GID associated with the first wireless device and the second wireless device; and
receiving, in response to the first paging message and the second paging message, paging responses from the first wireless device and the second wireless device at different timings that are associated with MIDs of the first wireless device and the second wireless device,
wherein the method further comprises:
receiving a first registration message from the first wireless device, the registration message including the first MID and the GID associated with the first wireless device;
updating a database to store information binding the first wireless device with the first MID and the GID;
receiving a second registration message from the second wireless device, the registration message including the second MID and the GID associated with the second wireless device; and
updating the database to store information binding the second wireless device with the second MID and the GID.

10. A wireless communication apparatus, comprising:
means for associating a first wireless device having a first member identifier (MID) and a group identifier (GID) and a second wireless device having a second member identifier (MID) with the same GID wherein the GID determines a same wake up time at which the first wireless device and the second wireless device wake up from their respective sleep modes and the first and second MIDs determine additional wake up times at which the first and second wireless devices wake up from their respective sleep modes, respectively;
means for receiving paging requests for the first wireless device and the second wireless device;
means for transmitting a first paging message and a second paging message to the first wireless device and the second wireless device, respectively, using the GID associated with the first wireless device and the second wireless device; and
means for receiving, in response to the first paging message and the second paging message, paging responses from the first wireless device and the second wireless device at different timings that are associated with MIDs of the first wireless device and the second wireless device,
wherein the wireless communication apparatus further comprises:
means for receiving a first registration message from the first wireless device, the registration message including the first MID and the GID associated with the first wireless device;
means for updating a database to store information binding the first wireless device with the first MID and the GID;
means for receiving a second registration message from the second wireless device, the registration message including the second MID and the GID associated with the second wireless device; and
means for updating the database to store information binding the second wireless device with the second MID and the GID.

11. A computer program product comprising a non-transitory computer readable having instructions stored thereon, the instructions comprising:
code for associating a first wireless device having a first member identifier (MID) and a group identifier (GID) and a second wireless device having a second member identifier (MID) with the same GID wherein the GID determines a same wake up time at which the first wireless device and the second wireless device wake up from their respective sleep modes and the first and second MIDs determine additional wake up times at which the first and second wireless devices wake up from their respective sleep modes, respectively;
code for receiving paging requests for the first wireless device and the second wireless device;
code for transmitting a first paging message and a second paging message to the first wireless device and the second wireless device, respectively, using the GID associated with the first wireless device and the second wireless device; and
code for receiving, in response to the first paging message and the second paging message, paging responses from the first wireless device and the second wireless device at different timings that are associated with MIDs of the first wireless device and the second wireless device,
wherein the computer program product further comprises:
code for receiving a first registration message from the first wireless device, the registration message including the first MID and the GID associated with the first wireless device;
code for updating a database to store information binding the first wireless device with the first MID and the GID;
code for receiving a second registration message from the second wireless device, the registration message including the second MID and the GID associated with the second wireless device; and
code for updating the database to store information binding the second wireless device with the second MID and the GID.

* * * * *